United States Patent Office 3,511,392
Patented May 12, 1970

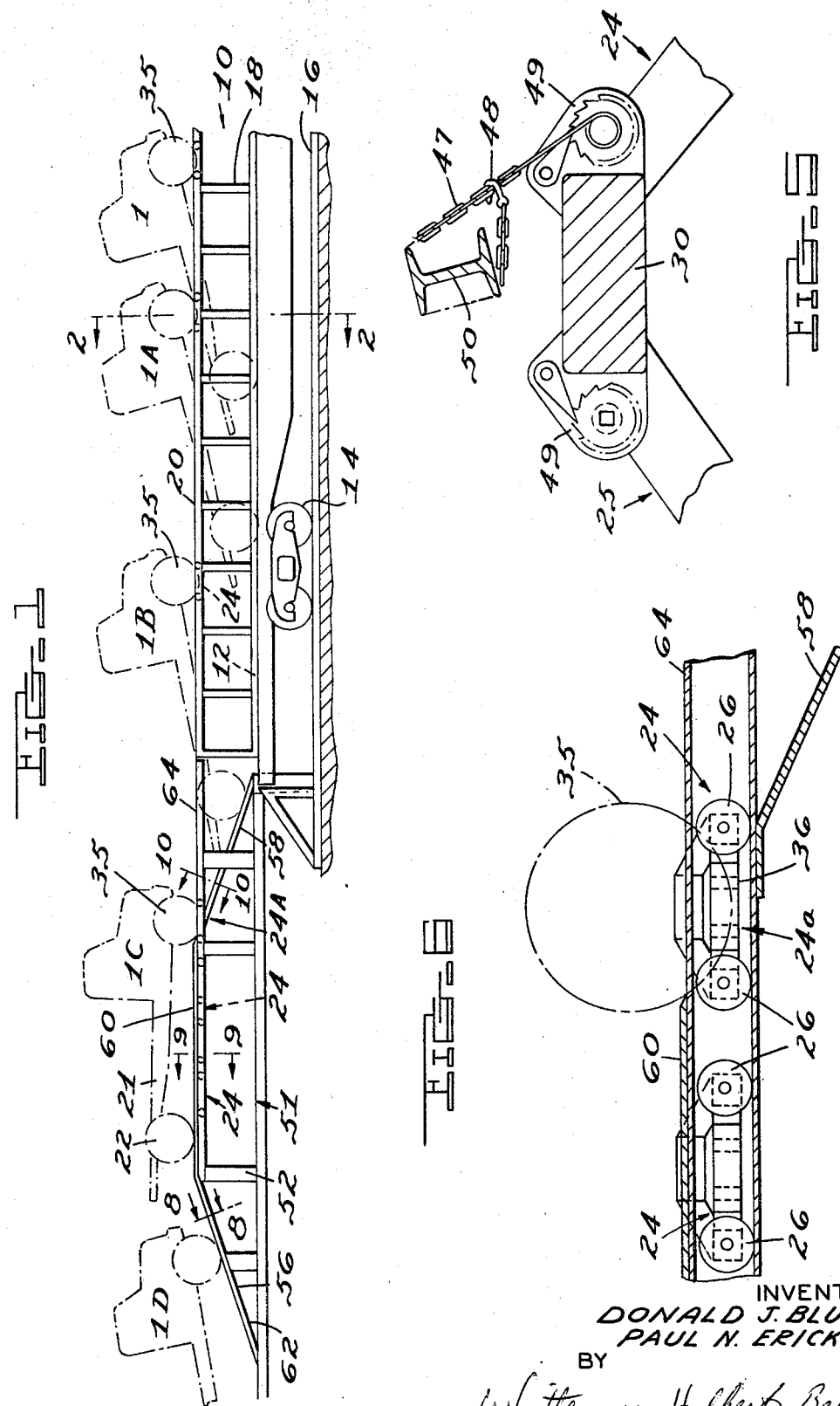

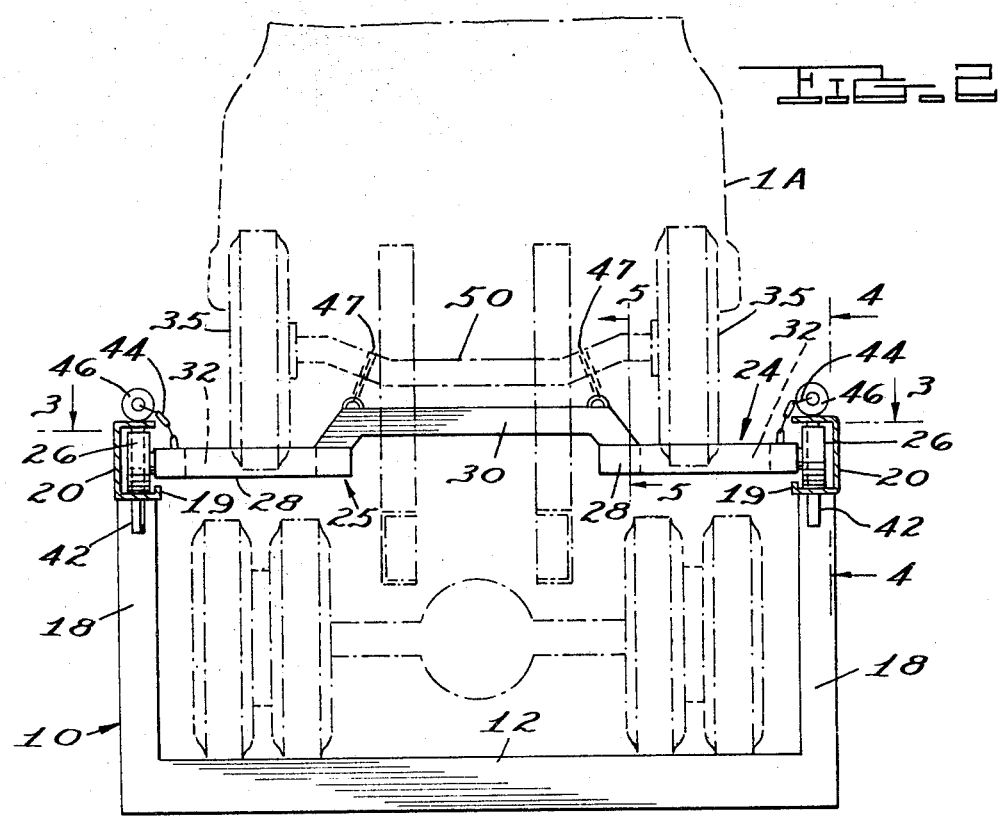
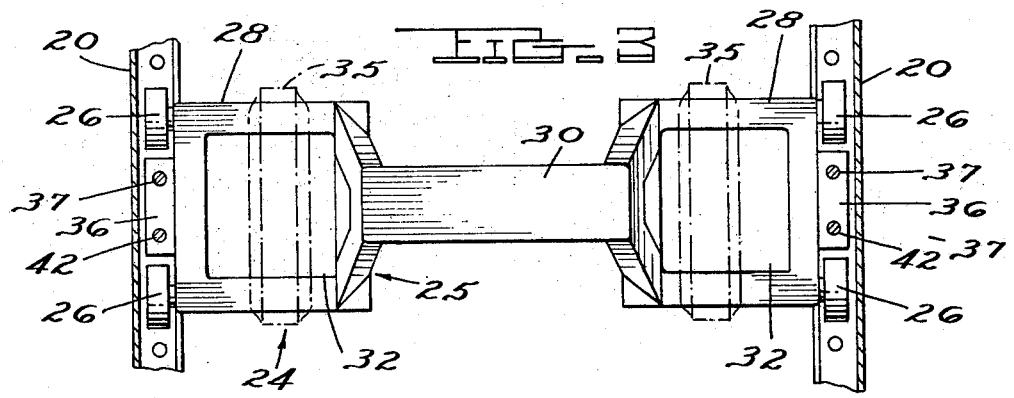
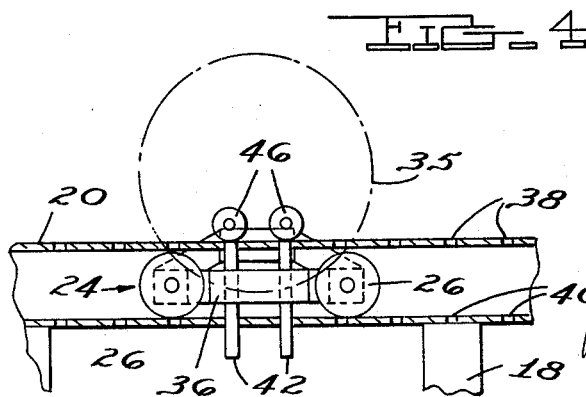
INVENTORS
DONALD J. BLUNDEN
PAUL N. ERICKSON
BY
Whittemore, Hulbert & Belknap
ATTORNEYS May 12, 1970   D. J. BLUNDEN ET AL   3,511,392
LOADING AND TRANSPORT SYSTEM FOR TRUCKS
Filed Nov. 29, 1968                                  3 Sheets-Sheet 3
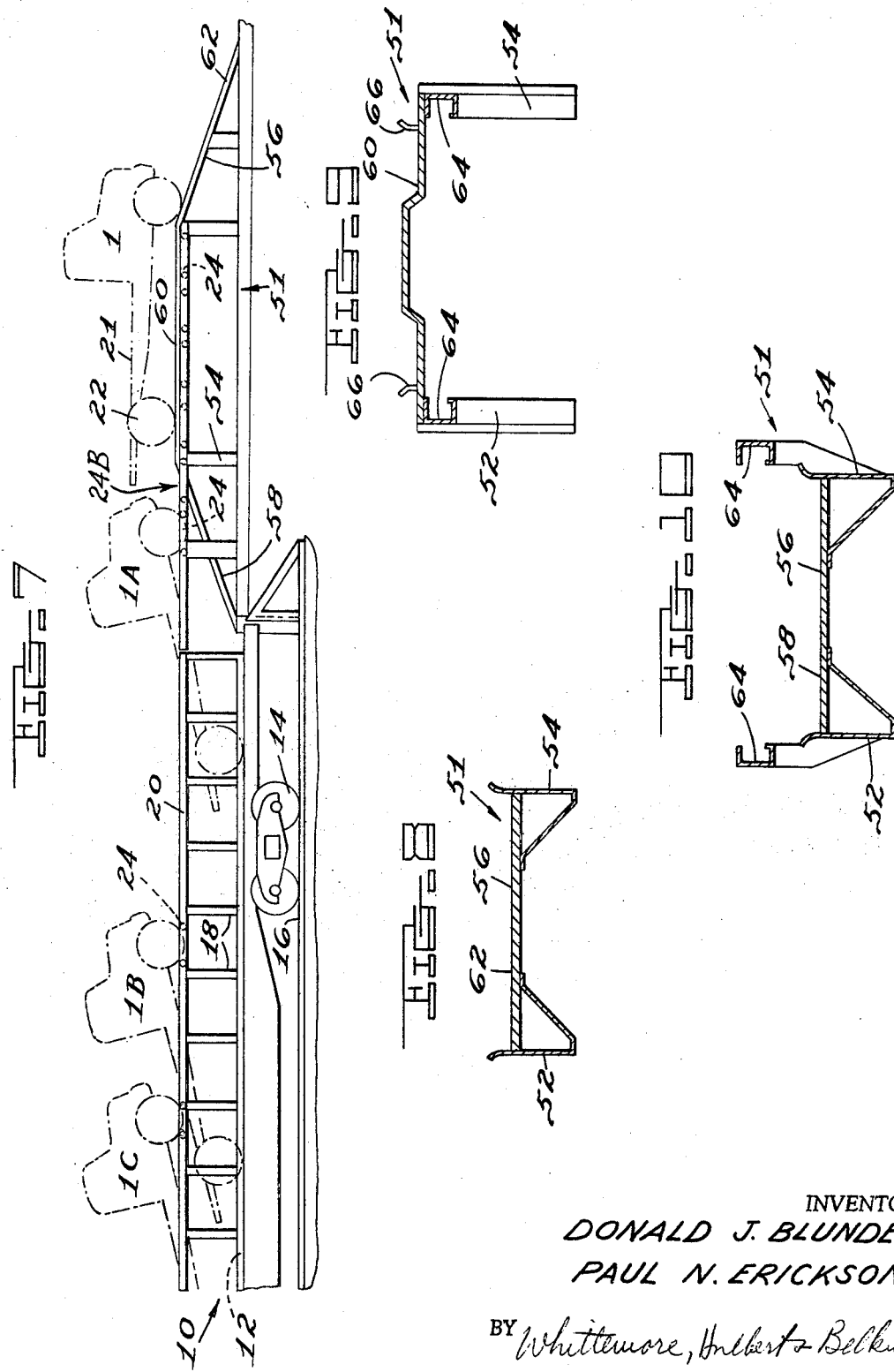
INVENTORS
DONALD J. BLUNDEN
PAUL N. ERICKSON
BY Whittemore, Hulbert & Belknap
ATTORNEYS

3,511,392
LOADING AND TRANSPORT SYSTEM FOR TRUCKS
Donald J. Blunden, Southfield, and Paul N. Erickson, Detroit, Mich., assignors to Whitehead & Kales Company, River Rouge, Mich., a corporation of Michigan
Filed Nov. 29, 1968, Ser. No. 780,056
Int. Cl. B65g 67/00
U.S. Cl. 214—38
15 Claims

ABSTRACT OF THE DISCLOSURE

This invention relates to a loading, unloading and transport system for vehicles and comprises a vehicle transport such as a rail car or trailer having tracks extending lengthwise above the deck of the transport, and a plurality of supports movable alonng the tracks and adapted to support the front ends of vehicles in raised position. Preferably the supports are secured in adjusted position such that the front end of each inclined vehicle, except the first in line, is disposed over the rear end and wheels of the vehicle ahead of it.

Apparatus is also provided for transferring vehicles to or from the transport, such apparatus comprising a dock having rails respectively extending in end-to-end continuation of the tracks on the transport when the transport is moved to a vehicle transfer position adjacent the dock so that the supports can be moved from the tracks to the rails and vice versa.

BACKGROUND OF THE INVENTION

"Saddle back" loading is an arrangement of in-line vehicle loading, with the front end of each vehicle raised and placed over the rear chassis and wheels of the inclined vehicle immediately in front of it. By thus placing the front end of one vehicle over the rear of another and supporting it thereon, overall linear distance of the loaded vehicles is reduced and obviously more vehicles can be loaded in a given length of transport.

"Saddle back" loading as presently performed requires each vehicle driven onto the transport to be lifted by a hoist or straddle crane. The front end of the lead vehicle is lifted and secured to a pedestal at the front end of the transport. The crane then lifts the front end of the next vehicle up over the rear end and wheels of the lead vehicle. A mounting saddle made of hardwood is fitted to the chassis of the lead vehicle and secured thereto by steel banding. The crane lowers the front end of the second vehicle into position on the top of this wood saddle so that the front axle rests on the wood saddle and transfers the weight to the chassis of the lead vehicle. The second vehicle is then secured by chains to the deck of the transport by various mechanical tie-down devices permanently attached to the deck of the transport. The front of each succeeding vehicle is lifted over and secured to a wood saddle on the chassis at the rear of the vehicle ahead of it in the same manner as the second vehicle. Both front and rear ends of the vehicles are required to be tied down because one vehicle rests upon another. If both ends were not tied down and the tie-down devices for one vehicle became loose all of the vehicles would be endangered.

At the unloading point, a crane, hoist and crew are again required to unload the vehicles. Since each vehicle rests upon the vehicle ahead of it, the last vehicle loaded must obviously be the first vehicle unloaded. The wood saddles are taken off (usually discarded) and the crane lifts each vehicle clear, moves it back, and sets it down at which point it must be backed off the transport by a driver. This procedure is repeated for each vehicle on the transport.

Although the present inclined "saddle back" loading system permits the maximum number of vehicles to be loaded in a given length, the means to accomplish this type of loading are extremely slow, costly and inefficient. The inherent disadvantages are:

(1) A crane and crew are required.

(2) Each vehicle must be individually lifted, moved and lowered into position on a pedestal or on wood saddles.

(3) The wood saddles must be handmade to fit and nest to various wheel heights.

(4) The wood saddles must be mounted and securely banded to the vehicle chassis. (Hardwood and steel banding are expensive.)

(5) Multiple tie-down chains must be extended and criss-crossed to span the height from the front axle or chassis down to the tie-down fittings on the transport deck.

(6) The upper vehicle front axle resting on the wood saddle transmits its static and dynamic loads directly to the chassis of the lower vehicle without the advantage of shock attenuation provided by the tires of the upper vehicle.

(7) The transport must be loaded and unloaded in one direction since the last vehicle loaded must be the first unloaded. This, in many cases, requires long delays in switching and reversing directions of the transport.

SUMMARY OF THE INVENTION

It is an essential object of this invention to provide an improved loading, unloading and transport system for vehicles which overcomes the disadvantages of the present day system.

Another object is to provide a system in which vehicles can be loaded and unloaded using only the motive power of the vehicle.

Another object is to provide a system in which the vehicle transport has laterally spaced parallel tracks above the deck, and a plurality of supports movable along and adapted to be secured in fixed position on the tracks for supporting the front ends of vehicles arranged in tandem on the transport in inclined position.

Another object is to provide a system in which the front ends of the vehicles are held in an elevated position by the supports over the rear ends of the preceding vehicles to simulate a "saddle back" loading arrangement.

Another object is to provide a system wherein the supports are saddle yokes comprising frame members extending transversely of the transport, preferably having rollers for engaging the tracks.

Another object is to provide the saddle yokes with wheel-receiving recesses adapted to receive and support the front wheels of the vehicles.

Another object is to provide means for securing the saddle yokes in selected positions along the tracks preferably including pins adapted to extend through selected holes spaced apart lengthwise of the tracks.

Another object is to provide apparatus for transferring vehicles to or from a transport of the type above described, comprising a dock having parallel rails respectively extending in end-to-end continuation of the tracks of the transport when the transport is moved to a vehicle transfer position adjacent the apparatus so that the saddle yokes can be moved from the tracks to the rails and vice versa.

Another object is to provide transfer apparatus having a vehicle ramp for guiding the front wheels of a vehicle to and from supported relation with the wheel-receiving recesses of a saddle yoke engaging the rails.

Another object is to provide a section of the rails of the transfer apparatus for the storage of unused saddle yokes.

Other objects and features of the invention will become apparent as the description proceeds, especially when taken in conjunction with the accompanying drawings, wherein:

FIG. 1 is a fragmentary side elevational view with parts in phantom lines and parts in section showing a rail car in position adjacent apparatus for loading trucks onto the rail car or for unloading the trucks from the rail car in a rearward direction.

FIG. 2 is a sectional view taken substantially on the line 2—2 of FIG. 1.

FIG. 3 is a fragmentary sectional view taken substantially on the line 3—3 of FIG. 2.

FIG. 4 is a fragmentary sectional view taken substantially on the line 4—4 of FIG. 2.

FIG. 5 is a fragmentary sectional view taken substantially on the line 5—5 of FIG. 2.

FIG. 6 is an enlarged fragmentary sectional view of a portion of the loading or unloading apparatus shown in FIG. 1.

FIG. 7 is a fragmentary view similar to FIG. 1 but showing the rail car in position for unloading the trucks in a forward direction.

FIGS. 8, 9 and 10 are sectional views taken substantially on the lines 8—8, 9—9 and 10—10 respectively of FIG. 1.

Referring now more particularly to the drawings, the vehicle transport is specifically shown as a rail car 10, although it might be some other type of transport such for example, as a highway trailer.

The elongated rail car 10 has an elongated generally horizontal deck or bed structure 12 extending lengthwise of the rail car and supported on the usual wheels 14 adapted to run on tracks 16. A plurality of vertical side rail supports 18 rise from the deck 12 in two rows extending lengthwise of the rail car on opposite sides thereof. Laterally spaced tracks 20 are secured to and extend along the tops of the side rail supports 18 in the two rows lengthwise of the rail car. These tracks are parallel to one another and preferably horizontal throughout their lengths and open at both ends to permit vehicle loading and unloading from either end of the rail car. The tracks 20 are of the substantially C-shaped cross section shown in FIG. 2 with the open sides of the C facing laterally inwardly or toward one another and preferably with an upturned flange 19 along the lower inner edge of each track. As will be apparent in FIG. 2, the width of the deck 12 and the spacing between the rows of uprights 18 and the tracks 20 is greater than the width of the wheeled vehicles 1, 1A, 1B, etc. to be carried on the rail car. These vehicles are shown as being trucks of the same construction.

The trucks 1, 1A, etc. are adapted to be loaded on the rail car in a simulated "saddle back" arrangement as shown in FIGS. 1 and 7 with the front end of each truck raised and placed over the rear chassis 21 and wheels 22 of the inclined truck immediately in front of it. The front ends of the trucks are held in raised position by supports or saddle yokes 24. These saddle yokes are preferably in the form shown, having transverse frame members 25 extending across the width of the rail car and having rollers 26 at the ends engaging the tracks 20. Each frame member has wheel-supporting plate-like end portions 28 connected to a raised intermediate bar 30, and the end portions 28 have wheel-receiving recesses 32 in the top surfaces adapted to receive and support the front wheels 35 of the trucks as shown in FIGS. 2 and 3.

Each saddle yoke 24 is shown as having four rollers 26, two rollers being journaled on one of the wheel-supporting portions 28 for rolling engagement in one track 20 and two rollers 26 being journaled on the other wheel-supporting portion 28 for rolling engagement in the other track 20.

Each wheel-supporting portion 28 of a saddle yoke 24 has a lock bar 36 extending laterally outwardly into one of the tracks 20 between rollers 26. These lock bars 36 each have at least one and preferably two holes 37. Each track 20 has a plurality of holes 38 in its upper flange spaced apart uniformly from end to end of the track, and a plurality of holes 40 in its lower flange respectively vertically aligned with the holes 38. The spacing between holes 37 in the lock bars 34 of saddle yokes 24 is the same as the spacing between holes 38 and 40. Lock pins 42 are adapted to be extended through aligned holes 36, 38 and 40 to lock the saddle yokes 24 in adjusted position along the length of the rail car. Preferably chains 44 attach the pins to the saddle yokes, such chains being shown as connected to eyes 46 on the upper ends of the pins 42 and to the wheel-supporting portions 28 of the frame members 25.

Any suitable means may be provided to secure the front ends of the trucks to the saddle yokes 24, and in the present instance flexible linear members preferably in the form of chains 47 are provided, having hooks 48 on their ends and being wound on suitable ratchet devices 49 on the bars 30 of the saddle yokes. These chains 47 may be looped over the front axle 50 of a truck and the hooks engaged with the chain links as shown, and the chains may be tightened by means of the ratchet devices 49 to secure the front end of a truck to a saddle yoke 24.

When the trucks are in loaded position on the rail car, the rear wheels 22 of the trucks are supported on the deck 12 and the front wheels 35 are supported by saddle yokes 24 in elevated position over the rear chassis 21 and wheels 22 of the inclined truck immediately in front. The tracks 20 support the saddle yokes 24 high enough above deck 12 of the rail car to clear the rear chassis and wheels of the next truck in the line so that each truck is individually supported and does not rest on another as is common in conventional saddle back loading.

The apparatus for loading or unloading trucks, is generally designated 51 in FIGS. 1 and 7 and its stationary structure located in fixed position on the ground at the end of the railroad tracks as shown. This apparatus may be mounted on the ground in a raised position with respect to the railroad tracks at approximately the elevation of the deck or bed structure 12 of the rail car. The apparatus comprises a dock having side framing 52 and 54 supporting a ramp 56 over which the trucks pass during loading and unloading. The ramp has a front section 58 disposed adjacent the end of the rail car when the rail car is in the transfer position shown in FIGS. 1 and 7, an intermediate section 60 and a rear section 62. The intermediate section is shown as being substantially horizontal and raised with respect to the ground level on which the dock is mounted, and the front section extends at an incline from the front edge of the intermediate section down to approximately the level of the deck of the rail car. The rear section inclines downwardly from the rear end of the intermediate section 60 to ground level.

The apparatus also includes a pair of rails 64 at either side of ramp 56 which are of substantially the same C-shaped cross section as the tracks 20 on the rail car. These rails 64 are parallel to one another and project horizontally as shown, and are spaced apart the same distance as the tracks 20 on the rail car so that when the rail car is in transfer position the ends of the rails 64 are in end-to-end continuation of the tracks 20 so that the saddle yokes 24 may pass from the tracks 20 to the rails 64 and vice versa.

The intermediate section 60 of the ramp is disposed above rails 64. The portion of the rails 64 beneath the intermediate section 60 of the ramp provide a collection or storage section for the saddle yokes. As shown in FIG.

9, the intermediate section 60 of the ramp has the wheel guides 66 for guiding the wheels of the truck into proper position with respect to the saddle yokes during a loading operation.

In order to load trucks onto a rail car, the rail car is placed in transfer position as shown in FIG. 1 and the trucks are driven over the loading dock 51. As each truck begins to move over the dock 51, a saddle yoke 24 will be placed in the position indicated at 24A in FIGS. 1 and 6 just forward of the front edge of the intermediate section 60 so that the front wheels of the truck 1C will drop into the wheel-receiving portions 32 of the saddle yoke 24. As the truck continues to advance, with the front end held elevated by a saddle yoke, the rear wheels will continue down the inclined front section 58 of the ramp onto the deck of the rail car. The saddle yoke 24 supporting the front wheels of the vehicle will transfer smoothly from rails 64 to the tracks 20 of the rail car, and the first truck loaded will be driven to the extreme front end of the rail car. The lock pins 42 are then used to lock the saddle yoke in the desired position of lengthwise adjustment with respect to the tracks 20, and the chains 47 are looped over the front axle 50 of the truck and secured down tightly. Actually, the front axle may be secured to the saddle yoke at some convenient point prior to its final loaded position on the rail car. Succeeding trucks are loaded in the same manner by being driven over the ramp 56 of the loading dock 51 and by positioning a saddle yoke in the position 24A to receive the front wheels of each truck as it leaves the intermediate ramp section 60. The trucks will be located on the rail car in inclined position as shown by the trucks 1 and 1A in FIG. 1, with each truck having its front end supported in elevated position by a saddle yoke. The front end of each inclined truck, except the lead truck, is thus supported over the rear chassis and wheels of the truck in front of it.

Since the trucks are not supported upon one another but are individually secured in a simulated saddle-back arrangement on the rail car and since both ends of tracks 20 are open, the trucks may be unloaded from either end of the rail car.

FIG. 7 shows the trucks being unloaded in a forward direction. FIG. 1 can be taken as an illustration of unloading in a reverse or rearward direction by moving the trucks off backwards. In either case, the traction of the rear wheels of the truck moves the truck in the desired direction over the loading and unloading dock 51. With reference to FIG. 7, when the front wheels of a truck approach the front end of the intermediate ramp portion 60, the front wheels climb out of the saddle yoke when the saddle yoke is in the position indicated at 24B and continue to roll across the intermediate ramp portion 60. The saddle yoke in the position 24A will then be pushed into the storage area of the rails 64 under the intermediate ramp section 60 by the rear wheels of the same truck. With reference to FIG. 1, when the trucks are unloaded in a rearward direction, the saddle yoke, in the position 24A after the front wheels of a truck being unloaded have lifted out, is pushed into the storage area of rails 64 by the rear wheels of the next truck unloaded. Obviously prior to unloading the saddle yokes must be unpinned from tracks 20 and at some point prior to position 24A or position 24B the front axles released from the saddle yokes.

The saddle yokes 24 described herein are constructed so as to clear the rear chassis and wheels of a loaded truck of a particular construction. Obviously the saddle yokes could be made adjustable so as to meet specific requirements depending upon different truck designs.

It will be obvious that any number of rail cars 10 may be positioned end-to-end at a loading dock and simultaneously loaded or unloaded. Temporary bridge plates or jumper skids may be provided across adjacent ends of the rail cars so that during loading the trucks may be driven the length of the series of rail cars in the line, loading the last rail car in the line first and continuing until all of the rail cars up to the one adjacent the loading dock have been loaded. Obviously a line of rail cars 10 may be unloaded in the same manner, using the temporary bridge plates and jumper skids between cars.

The length of the rails 64 extending rearward from the position 24A illustrated in FIGS. 1 and 6 should be long enough to store a sufficient number of saddle yokes to load an entire rail car, and preferably should be long enough to hold a sufficient number of saddle yokes to load several rail cars.

The foregoing concept of simulated saddle-back loading eliminates the building, mounting and banding of wood saddles. It eliminates the tedious placement of each truck into position along the length of the rail car by traveling crane or hoist. It allows the circus loading of an entire train of cars in either direction. The elaborate deck tie-down devices and hardware are not required, and the awkward wrapping of tie-down chains around the axle and down to the deck fittings is eliminated. The upper truck does not transmit its load to the chassis and suspension of the lower truck through a rigid wood saddle support. Since the front of each truck rests by its tires on a saddle yoke, the tires and spring suspension can function as designed and attenuate the static and dynamic shocks of rail haul transport. The rear ends of the trucks do not need to be tied down. Valuable loading and unloading time is gained and at the same time labor requirements are reduced.

What we claim as our invention is:

1. In combination, a vehicle transport having an elongated deck, parallel tracks extending lengthwise of said deck in spaced relation thereabove, said tracks being spaced apart laterally a distance greater than the width of the vehicles to be transported, a plurality of supports extending between and engaging said tracks for movement lengthwise of said deck, said supports being adapted to support the front ends of vehicles arranged in tandem on said transport whose rear wheels are supported on said deck, and means for securing said supports to said tracks.

2. The combination defined in claim 1, wherein said supports comprise frame members extending transversely of said transport having rollers engaging said tracks.

3. The combination defined in claim 1, wherein said supports have wheel-receiving recesses adapted to receive and support the front wheels of the vehicles.

4. The combination defined in claim 3, wherein said means for securing said supports to said tracks includes pins carried by said frame members, and holes in said tracks spaced apart lengthwise thereof for receiving said pins.

5. The combination defined in claim 2, wherein each frame member has a pair of laterally spaced upwardly facing wheel-receiving recesses adapted to receive and support the front wheels of a vehicle, and means are provided for securing the front ends of the vehicles to said supports comprising linear members carried by said frame members and adapted to be connected to the front axles of the vehicles, said means for securing said supports to said tracks including holes in the ends of said frame members, holes in said tracks spaced apart lengthwise thereof, and pins engageable in the holes in said frame members and in selected holes in said tracks to secure said supports to said tracks in adjusted positions lengthwise thereof.

6. The combination defined in claim 1, including apparatus for transferring vehicles to or from said transport comprising rails having their front ends respectively extending in end-to-end continuation with the tracks of said transport when said transport is moved to a vehicle transfer position adjacent said apparatus so that said supports can be moved from said tracks to said rails and vice versa, said apparatus also having a vehicle ramp for guiding the front wheels of a vehicle to and from supported relation with a support engaging said rails.

7. The combination defined in claim 3, wherein both ends of said tracks are open, and including apparatus for transferring vehicles to or from said transport comprising a dock provided with parallel rails having their front ends respectively extending in end-to-end continuation with the tracks of said transport when said transport is moved to a vehicle transfer position with either end adjacent said dock so that said supports can be moved from said tracks to said rails and vice versa, said dock also having a vehicle ramp for guiding the front wheels of a vehicle to and from supported relation with the wheel-receiving portions of a support engaging said rails.

8. The combination defined in claim 7, wherein said ramp has a section spaced rearwardly from the front ends of said rails, the front end of said ramp section supporting the front wheels of a vehicle at a level above the wheel-receiving portions of a support located on said rails adjacent said front end of said ramp section to cause such front wheels of a vehicle being loaded to drop from the front end of said ramp section into said wheel-receiving portions and to cause such front wheels of a vehicle being unloaded to be lifted out of said wheel-receiving portions onto said front end of said ramp section.

9. The combination defined in claim 8, wherein said rails have sections rearwardly of said front end of said ramp section for the collection and storage of unused supports.

10. The combination defined in claim 8, wherein said ramp has a front section extending forwardly in continuation of said first-mentioned ramp section inclined downwardly and terminating at its front end adjacent to the end of the deck of said transport when the latter is in vehicle transfer position.

11. Apparatus for transferring wheeled vehicles to or from a transport of the type having an elongated deck, parallel tracks extending lengthwise of the deck in spaced relation thereabove and spaced apart laterally a distance greater than the width of the vehicles to be transported, and a plurality of supports extending between and engaging said tracks for movement lengthwise of the deck and adapted to support the front ends of vehicles arranged in tandem on the transport whose rear wheels are supported on the deck, said apparatus comprising parallel rails having their front ends respectively extending in end-to-end continuation with the tracks of the transport when the transport is moved to a vehicle transfer position adjacent said apparatus so that the supports can be moved from the tracks to said rails and vice versa, said apparatus also having a vehicle ramp for guiding the front end of a vehicle to and from supported relation with a support engaging said rails.

12. Apparatus for transferring wheeled vehicles to or from a transport of the type having an elongated deck, parallel tracks extending lengthwise of the deck in spaced relation thereabove and spaced apart laterally a distance greater than the width of the vehicles to be transported, and a plurality of supports extending between and engaging said tracks for movement lengthwise of the deck and having wheel-receiving portions adapted to support the front wheels of vehicles arranged in tandem on the transport whose rear wheels are supported on the deck, said apparatus comprising a dock provided with parallel rails having their front ends respectively extending in end-to-end continuation with the tracks of the transport when the transport is moved to a vehicle transfer position adjacent said dock so that the supports can be moved from the tracks to said rails and vice versa, said dock also having a vehicle ramp for guiding the front wheels of a vehicle to and from supported relation with the wheel-receiving portions of a support engaging said rails.

13. The apparatus defined in claim 12, wherein said ramp has a section spaced rearwardly from the front ends of said rails, the front end of said ramp section supporting the front wheels of a vehicle above the level of the wheel-receiving portions of a support located on said rails adjacent said front end of said ramp section to cause such front wheels of a vehicle being loaded to drop from the front end of said ramp section into said wheel-receiving portions and to cause such front wheels of a vehicle being unloaded to be lifted out of said wheel-receiving portions and onto said front end of said ramp section.

14. The apparatus defined in claim 13, wherein said rails have sections rearwardly of said front end of said ramp section for the collection and storage of unused supports.

15. The apparatus defined in claim 13, wherein said ramp has a front section extending forwardly in continuation of said first-mentioned ramp section inclined downwardly and terminating at its front end adjacent to the end of the deck of a transport in vehicle transfer position.

References Cited

UNITED STATES PATENTS

| | | | |
|---|---|---|---|
| 1,750,131 | 3/1930 | Romine | 214—38 |
| 3,052,365 | 9/1962 | Cameron | 214—75 |
| 3,305,114 | 2/1967 | Bellingher | 296—1 XR |

ROBERT G. SHERIDAN, Primary Examiner

U.S. Cl. X.R.

105—368; 214—83.24; 296—1